Figure 1:
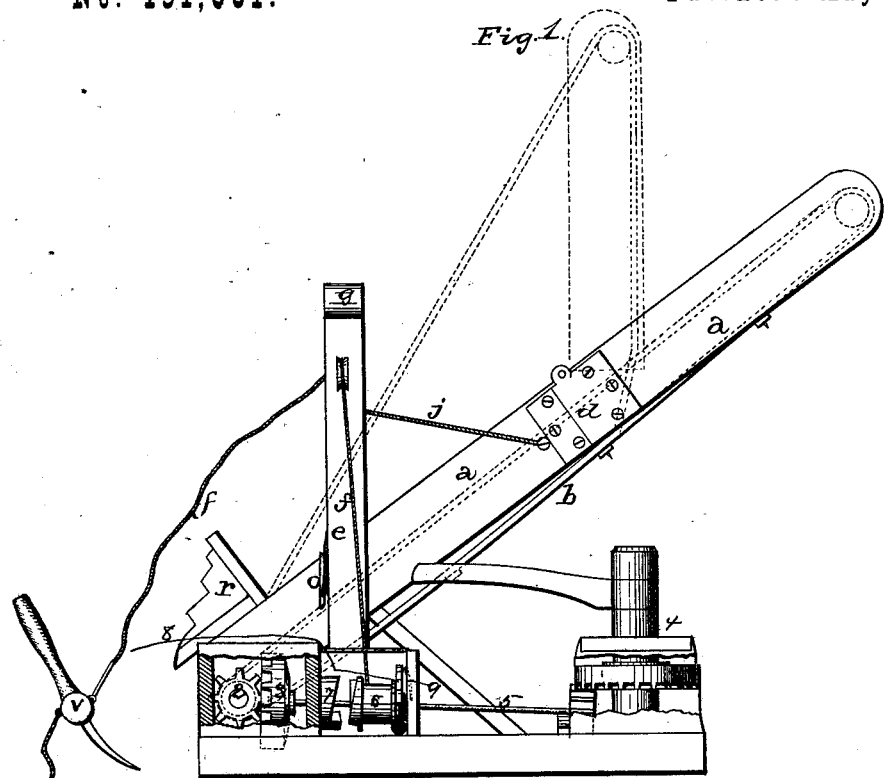
Figure 2:
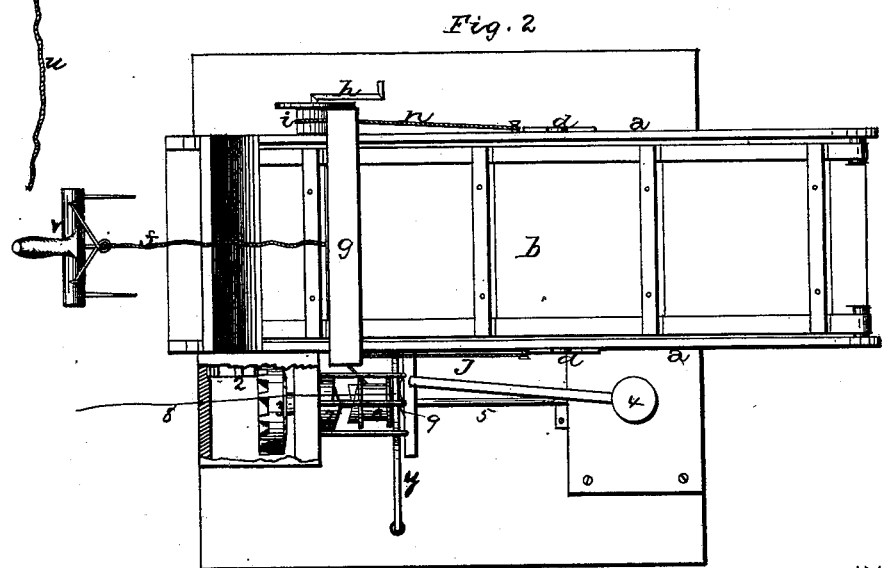
Figure 3:
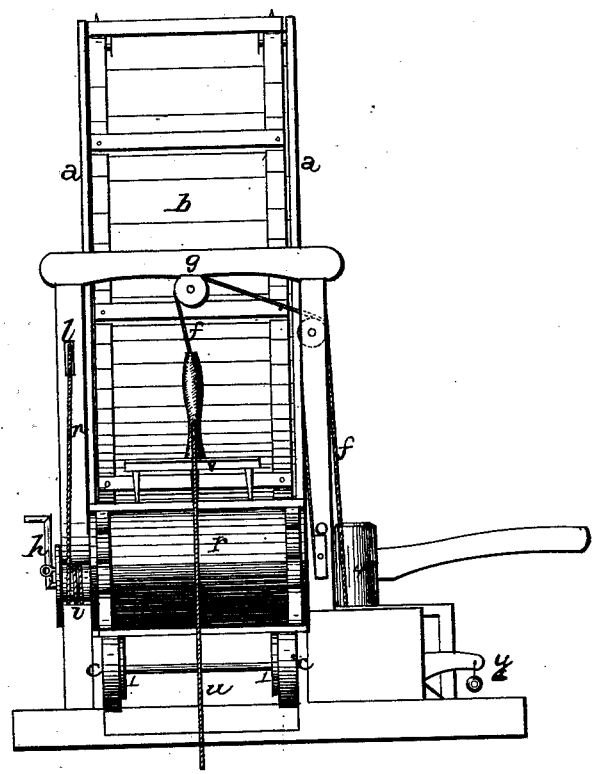
Figure 4:
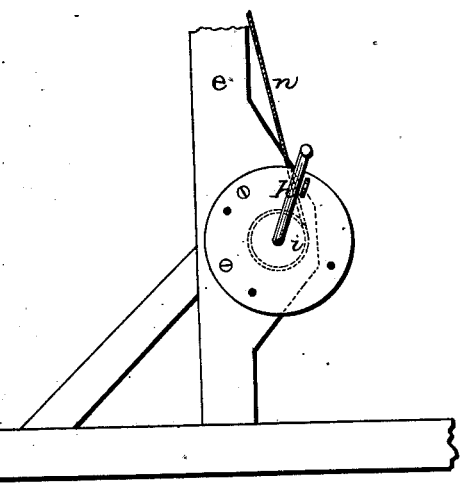

J. CHASE.
HAY-STACKER.

No. 191,001.

2 Sheets, Sheet 1.

Patented May 22, 1877.

WITNESSES:
J. Wm Garners
Albert J. de Zyfk

INVENTOR:
Job Chase
per
F. A. Lehmann,
atty.

2 Sheets—Sheet 2.

J. CHASE.
HAY-STACKER.

No. 191,001. Patented May 22, 1877.

WITNESSES.

INVENTOR:
Job Chase
per
F. A. Lehmann,
atty.

UNITED STATES PATENT OFFICE.

JOB CHASE, OF LANGWORTHY, IOWA.

IMPROVEMENT IN HAY-STACKERS.

Specification forming part of Letters Patent No. 191,001, dated May 22, 1877; application filed April 3, 1877.

*To all whom it may concern:*

Be it known that I, JOB CHASE, of Langworthy, in the county of Jones and State of Iowa, have invented certain new and useful Improvements in Combined Hay-Stacker and Horse-Fork; and I do hereby declare the following to be a full, clear, and exact description of the invention, such as will enable others skilled in the art to which it pertains to make and use it, reference being had to the accompanying drawings, which form part of this specification.

My invention relates to an improvement in hay-stackers; and it consists in the arrangement and combination of devices, that will be more fully described hereinafter, whereby a horse hay-fork can be thrown into gear with the operating mechanism, so as to elevate hay from the ground or wagon and raise it to a platform, from which an endless belt takes it and carries it up into the mow or to the top of rick.

The accompanying drawings represent my invention.

$a$ represents the frame, over which an endless apron, $b$, runs. This frame is jointed at its lower end, at $c$, so that it can be raised to an almost vertical position or lowered to any desired degree backward. At the point $d$, a little more than half-way up, this frame is hinged or jointed, so that the top can be lowered or closed downward, and thus not take up so much room.

Rising on each side of the frame $a$, to a suitable distance, are the two braced standards $e$, which have their upper ends joined together by the cross-beam $g$. Pivoted to one of the standards is a grooved pulley, $i$, which is operated by means of a crank, $h$. Fastened to the frame $a$, and passing over the pulley $l$ down to the pulley $i$, is the cord, rope, or chain $n$, by means of which the frame is raised or lowered to any desired degree. The crank is prevented from turning past any desired point by means of a stop-pin or other equivalent device. To the opposite side of the frame is fastened another rope, $j$, which passes through an eye or over a pulley on the standard, and is fastened around the hooks or other catch at $o$, and which rope serves to balance that side of the frame.

Secured to the front lower end of the frame $a$ is a platform, $r$, upon which the hay or straw is to be thrown, and from which it is carried up to the mow or top of the rick by means of the endless belt $b$. The roller 1 at the lower end of the frame $a$, and which operates the belt, has a pinion, 2, on its end, which meshes with the gear-wheel 3 on the end of the shaft that runs from the horse-power 4. These two wheels are inclosed in a tight box, so as to protect them from dust and dirt. On the shaft 5, that runs from the horse-power, is a clutch, 7, which is made to engage with a sliding drum, 6, which can be drawn in contact with the ratchet at any moment by means of the rope 8, so as to make it revolve with the shaft, and which is drawn backward again by a spring, 9.

When the drum is in gear with the ratchet the rope $f$ is wound upon it, thereby drawing the horse hay-fork upward toward the cross-beam $g$. The fork $v$, which may be of the construction here shown or any other, and have a rope, $u$, attached to its rear side to guide it, having been stuck into the hay, either on the ground or wagon, the drum is thrown into gear with the revolving ratchet, and the hay is raised upward or forward to the platform, from which it is carried upward by the belt $b$. The drum is provided with a weighted lever, $y$, which acts as a brake to keep it from unwinding.

The stacker is intended to be placed upon a truck, so that it can be easily moved about.

By having the platform secured to the frame, so as to move with it, it matters not in what position the frame may be placed, as the platform always retains the same relative position, and any hay or straw that may be placed upon it will at once be carried upward by the belt. Were these two parts not secured together, any adjustment of the frame backward or forward would separate them, so that the belt would no longer be able to carry up the hay and straw that was thrown on the platform without the assistance of some one to throw the hay or straw on it.

Having thus described my invention, I claim—

The combination of the driving-shaft 5, clutch 7, sliding drum 6, hay-fork $v$, ropes $f$ 8, and the endless belt $b$ and its driving-pinions 2 3, whereby the fork can be operated at the same time and by the same power as the belt $b$, or thrown out of gear at will, substantially as described.

In testimony that I claim the foregoing I have hereunto set my hand this 21st day of March, 1877.

JOB CHASE.

Witnesses:
S. C. BATCHELDER,
ROMANTES BATCHELDER.